3,636,124
POLYOLEFIN PRODUCTION
John R. Coleman, Jr., Littleton, David W. Hall, Englewood, and Frank L. Dormish, Denver, Colo., assignors to Marathon Oil Company, Findlay, Ohio
Filed Sept. 25, 1969, Ser. No. 861,100
Int. Cl. C07c 1/20, 41/12
U.S. Cl. 260—681
9 Claims

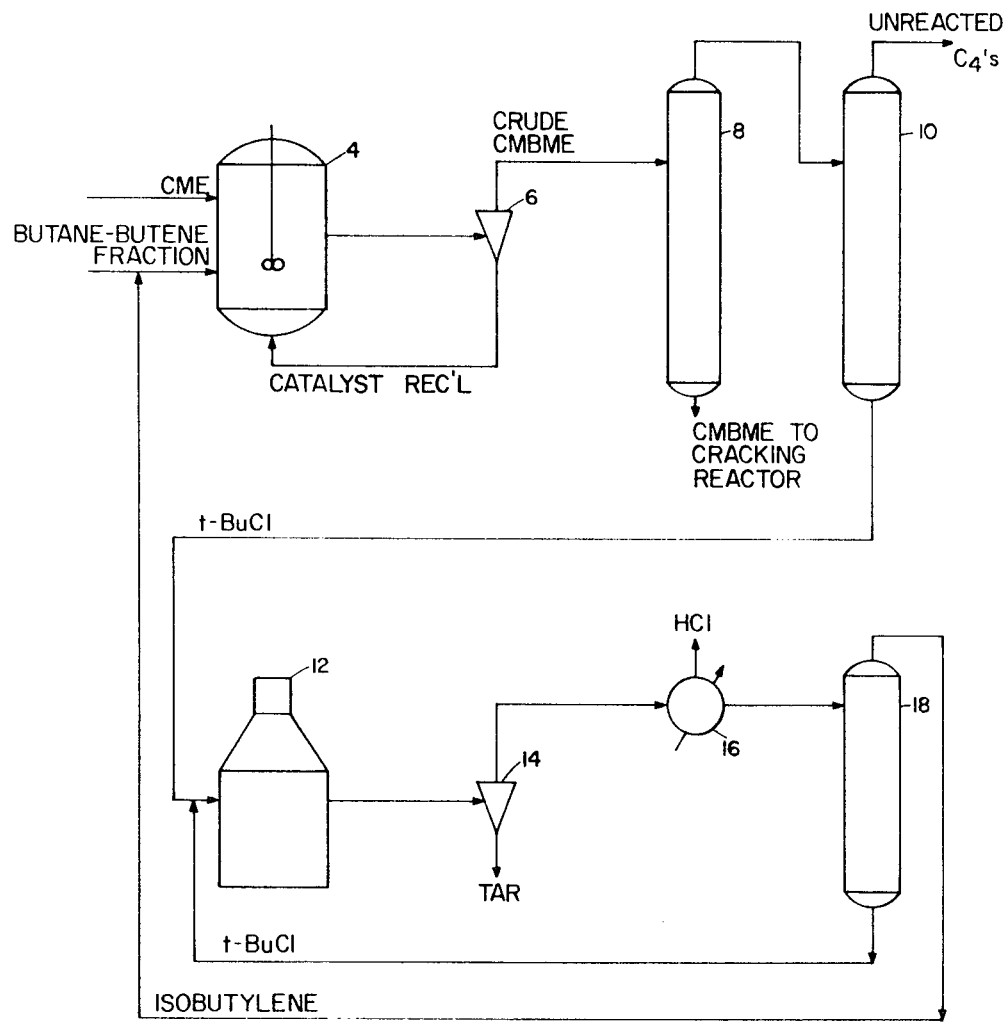

ABSTRACT OF THE DISCLOSURE

In the preparation of polyolefins by reacting a halo-ether and an olefin and splitting hydrogen halide and alcohol from the intermediate adduct, a side reaction occurs between olefin and hydrogen halides to produce a halide of the olefin. This by-product is cracked to form olefin and hydrogen halides which are recycled for use as starting materials in the process of making the polyolefins.

BACKGROUND OF THE INVENTION

This invention relates to the production of polyolefins, e.g. the process described in U.S. Pat. 3,360,583. In the process of that patent, conjugated dienes are prepared by reacting alpha halo ethers with olefins and splitting out hydrogen halide and an alcohol from the resulting halo ether adduct. The patent broadly sets forth useful starting materials and reaction conditions for the process. In general, the halo ethers are substituted in the alpha position with chloro, bromo, or iodo and are methyl, ethyl, or propyl symmetrical or unsymmetrical alpha-halo ethers. Examples include: bis(chloromethyl) ether, dichloromethyl methyl ether, and chloromethyl methyl ether. The reactive olefins are also broadly set forth and include halo-substituted olefins. Examples of olefins include allyl chloride, 1-butene, isobutene, and preferably olefins having from 2 to 9 carbon atoms. A petroleum fraction containing a mixture of olefins, such as a $C_4$ fraction, is also useful in the process.

The adduction of the haloether to the olefin is generally carried out in the presence of a Friedel-Crafts catalyst, such as titanium tetrachloride or zirconium tetrachloride at a temperature of −30° to 70° C., preferably from 20 to 30° C. Once the haloether adduct has been prepared by reaction of the alpha haloether with the olefin in the presence of a catalyst, the halo ether adduct is cracked at from 90 to 350° C., preferably from 120 to 180° C. to form a desired conjugated polyene. This pyrolysis reaction is advantageously carried out in the presence of a basic tertiary amide solvent, such as N-methyl-2-pyrrolidone. In general, the solvents may have base or dissociation constants ($K_b$) of less than about $1 \times 10^{-10}$, preferably between $10^{-11}$ and $10^{-18}$, as measured in aqueous solutions at 20–25° C. In the alternative, the cracking operation may desirably be conducted in the presence of a suitable molecular sieve catalyst, e.g. acid oxide cracking catalysts such as silicon aluminum, silica gel, SK–500 molecular sieves (Norton Co.) and those described in U.S. Pat. 3,360,583.

Conjugated diolefins made in accordance with the above process have found increasing use in the elastomer and insecticide industries. A particularly preferred product is isoprene, a valuable monomer in the production of polyisoprene for use in the rubber industry.

In U.S. 3,360,583, a side reaction occurs between a portion of the olefin reactant and hydrogen halide (liberated, for example, by the partial cracking of the intermediate saturated ether adduct). This unwanted by-product, the halide of the olefin, contributes to a loss of valuable reactants and poses removal problems in purifying and isolating the desired polyolefin from the product mixture.

SUMMARY OF THE INVENTION

The by-product formed by the reaction of olefin and hydrogen halide in a process for producing polyolefins by reacting olefins with halo ethers, followed by splitting hydrogen halide and alcohol from the intermediate adduct, is separated from the polyolefin-containing product mixture by distillation and then cracked to produce hydrogen halide and olefin. The latter (and/or former) is recycled for subsequent use as reactant in the process.

PREFERRED EMBODIMENTS OF THE INVENTION

As an illustration of a preferred embodiment of the present invention, reference is made to the accompanying drawing, which represents a process flow sheet for the production of isoprene with provisions for separating the by-product t-butyl chloride, cracking it, and recycling the isobutylene and HCl thus formed.

In the drawing, 123 lb./hr. of a titanium tetrachloride recycle catalyst, 12,898 lb./hr. chloromethyl methylether (CME) (made, for example, from formaldehyde, hydrogen chloride, and methanol) along with 37,929 lb./hr. of a butane-butene petroleum fraction and recycle isobutylene are charged to addition reactor 4 where the adduct 3-chloro-3-methylbutyl methyl ether (CMBME) is formed at 70° F. Catalyst is isolated from the CMBME mixture in separator 6 and recycled to reactor 4. 50,415 lb./hr. of the crude CMBME product are sent to fractionator 8 where a split is made between CMBME and overheads containing unreacted $C_4$'s and t-butyl chloride. The relatively pure CMBME is preferably charged to a cracking reactor where HCl and methyl alcohol are split from the adduct at about 250° F. to give crude isoprene. Polymerization grade isoprene ($\sim$99+% pure) may be obtained by a further purification step.

Unreacted $C_4$ components of the butane-butene fraction originally charged as feed to reactor 4 are driven off overhead in a second distillation column 10. The bottoms stream from column 10 consists essentially of pure t-butyl chloride, 633 lb./hr., which is charged along with recycle and, optionally, make-up t-butyl chloride (not shown) to t-butyl chloride cracker 12. A catalyst may be employed, preferably a transition metal halide, e.g. $ZrCl_4$. This stream is thermally cracked at temperatures near 700° F. to produce a stream containing isobutylene, hydrogen chloride, a small amount of tar and some unreacted t-butyl chloride. In general, the temperature during the cracking stage is preferably from about 380 to about 800 and more preferably from about 420 to about 700° F. Pressures, while not narrowly critical, will range preferably from subatmospheric to about 100 atmospheres and more preferably near atmospheric pressure. Generally, lower temperatures require higher pressures and vice-versa. The cracker effluent passes through tar separator 14 where 6 lb./hr. tar is discharged. The remaining tertiary butyl chloride, HCl and isobutylene enter partial condensor 16 at a rate of 232 lb./hr. where HCl is separated overhead for recycle or other use. The condensate enters distillation column 18 where a split is made between t-butyl chloride for recycle to cracker 12 and overhead isobutylene (395 lb./hr.) for recycle to addition reactor 4.

At least a portion, preferably all, of the hydrogen chloride and methyl alcohol produced during the process are recycled to the chloromethyl methylether synthesis step (not shown). Thus, the cracked products of t-butyl chloride are continuously utilized in the overall process for making isoprene.

The butane-butene feed used in the process is a mixed $C_4$ stream, produced in a conventional refinery catalytic cracking process, for example. The $C_4$ fraction may be partially fractionated first. Pure isobutylene may be optionally used as feed.

In another embodiment, isobutylene may be prepared from a mixed $C_4$ stream by contacting the stream in a packed column with hydrogen chloride, water, and methanol. The hydrogen chloride reacts selectively with the isobutylene contained in the $C_4$ stream to produce an aqueous phase containing methanol, water, and t-butyl chloride and an organic phase consisting of unreacted $C_4$'s. The t-butyl chloride thus formed may be isolated from the water-methanol stream by distillation and subsequently fed to the t-butyl chloride cracking reactor 12 for isolation of isobutylene to be fed to addition reactor 4.

In a further embodiment, the crude CMBME overhead from separator 6 may be charged directly to a cracking reactor for production of isoprene, and the t-butyl chloride present in the cracker effluent separated and passed to t-butyl chloride cracker 12 as before. This alternative method is sometimes preferred because the CMBME cracking reactor serves to partially crack the t-butyl chloride present to give isobutylene and HCl for recycle.

Various other modifications and variations of the invention will become apparent to those skilled in the art upon a reading of the present specification. The scope of the invention should be limited only by the specification and appended claims and equivalents thereof.

What is claimed is:

1. In a process for the preparation of polyolefinic compounds comprising reacting an alpha-halo ether with a reactive olefin to form a haloether adduct of the olefin and a by-product formed from the reaction of hydrogen halide and olefin, and splitting hydrogen halide and alcohol from the halo ether adduct to form a polyolefinic compound, the improvement comprising separating the by-product, cracking the by-product to form olefin and hydrogen halide, and recycling at least a portion of the olefin formed to react with the alpha-halo ether.

2. In a process for the production of polyolefinic compounds by pyrolysis of an intermediate halo ether adduct prepared by reacting a reactive olefin with an alpha-halo ether, the improvement comprising: reacting alpha-halo ether and reactive olefin to form the halo ether adduct and hydrogen halide, said hydrogen halide and reactive olefin reacting to form a by-product in admixture with the halo ether adduct; cracking the by-product to form reactive olefin and hydrogen halide, and recycling at least a portion of the olefin formed to react with the alpha-halo ether.

3. The process of claim 2 wherein the reaction between olefin and alpha halo ether is conducted in the presence of a Friedel-Crafts catalyst.

4. The process of claim 2 wherein the polyolefin compound is a conjugated diene.

5. The process of claim 2 wherein the adduct and by-product are fed in admixture to the pyrolysis reactor for preparation of the polyolefinic compounds.

6. The process of claim 2 wherein the polyolefinic compound is isoprene, the alpha halo ether is chloromethyl methyl ether, the reactive olefin is isobutylene or a petroleum fraction containing isobutylene, and the by-product formed and subsequently cracked is t-butyl chloride.

7. The process of claim 6 wherein the t-butyl chloride formed is withdrawn after the reaction between the alpha halo ether and olefin and prior to the splitting of the halo ether adduct.

8. The process of claim 5 wherein the cracked products of t-butyl chloride are HCl and isobutylene, and where at least a portion of this isobutylene is recycled for reaction with chloromethyl methyl ether to form the halo ether adduct.

9. The process of claim 8 wherein at least a portion of the HCl formed is recycled for synthesis of chloromethyl methyl ether.

References Cited

UNITED STATES PATENTS

| 2,156,070 | 4/1939 | Stern et al. | 260—677 |
| 2,673,788 | 3/1954 | Chipman | 260—677 |
| 3,360,583 | 12/1967 | Hall et al. | 260—681 |
| 3,377,405 | 4/1968 | Hurley et al. | 260—681 |

DELBERT E. GANTZ, Primary Examiner

G. E. SCHMITKONS, Assistant Examiner

U.S. Cl. X.R.

260—616, 657